(12) United States Patent
Kawaguchi et al.

(10) Patent No.: US 6,826,131 B2
(45) Date of Patent: Nov. 30, 2004

(54) MAGNETO-OPTICAL RECORDING MEDIUM HAVING MULTIPLE MAGNETIC LAYERS

(75) Inventors: Yuuko Kawaguchi, Osaka (JP); Motoyoshi Murakami, Osaka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 285 days.

(21) Appl. No.: 09/975,525

(22) Filed: Oct. 10, 2001

(65) Prior Publication Data

US 2002/0048226 A1 Apr. 25, 2002

(30) Foreign Application Priority Data

Oct. 11, 2000 (JP) ........................................ 2000-310394

(51) Int. Cl.[7] .............................................. G11B 11/00
(52) U.S. Cl. ............................... 369/13.44; 369/13.46; 369/13.07; 428/694 MM
(58) Field of Search ........................... 369/13.44, 13.46, 369/13.42, 13.35, 13.49, 13.51, 13.07, 13.06, 13.08, 13.09; 428/694 ML, 694 MM, 694 EC (56) References Cited

U.S. PATENT DOCUMENTS

| | | | |
|---|---|---|---|
| 5,936,915 A | * 8/1999 | Fujii et al. | ................ 369/13.42 |
| 5,995,472 A | * 11/1999 | Fujii et al. | ................ 369/13.05 |
| 6,018,511 A | * 1/2000 | Nishikiori et al. | ........ 369/13.49 |
| 6,027,825 A | 2/2000 | Shiratori et al. | |
| 6,147,939 A | 11/2000 | Takahashi et al. | |
| 6,519,211 B1 | * 2/2003 | Murakami et al. | ........ 369/13.08 |

FOREIGN PATENT DOCUMENTS

| | | |
|---|---|---|
| JP | 6-290496 | 10/1994 |
| JP | 7-114750 | 5/1995 |
| JP | 11-134730 | 5/1999 |
| JP | 11-273170 | 10/1999 |

OTHER PUBLICATIONS

"Ghostless Signal Reproduction with the Domain Wall Displacement Detection Method" by Tsutomu Shiratori et al., Proceedings of Magneto–Optical Recording International Symposium '99, J. Magn.Soc.Jpn., vol. 23, Supplement, No. S1, pp. 145–146, 1999.

* cited by examiner

*Primary Examiner*—Tan Dinh
(74) *Attorney, Agent, or Firm*—Merchant & Gould P.C.

(57) ABSTRACT

A multilayer film including a first magnetic layer, a second magnetic layer, and a third magnetic layer in the stated order is formed so that a Curie temperature $T_{C2}$ of the second magnetic layer is set to be lower than a Curie temperature $T_{C1}$ of the first magnetic layer and a Curie temperature $T_{C3}$ of the third magnetic layer and that the third magnetic layer is a perpendicular magnetization film. In at least a part of a region at a temperature lower than $T_{C2}$, the first magnetic layer is perpendicularly magnetized by exchange coupling with the second magnetic layer, and the magnetization of the third magnetic layer is transferred to the first magnetic layer via the second magnetic layer because of the exchange coupling. The second magnetic layer is made of a magnetic layer that remains in an in-plane magnetization state at room temperature and is perpendicularly magnetized in a temperature range from a critical temperature $T_{CR}$ higher than room temperature to the Curie temperature $T_{C2}$ of the same. Thus, in a magneto-optical recording medium to which the magnetic-domain enlarging-reproducing method is applied, upon reproduction of information utilizing the magnetic-domain enlargement, magnetic influences from tracks adjacent to a target track are suppressed.

20 Claims, 8 Drawing Sheets

MAGNETO-OPTICAL RECORDING MEDIUM HAVING MULTIPLE MAGNETIC LAYERS

BACKGROUND OF THE INVENTION

1. Field of the Invention

The present invention relates generally to a magneto-optical recording medium to/from which information is recorded/reproduced with a laser beam by utilizing magneto-optical effects, and to a method for reproducing information recorded in this medium.

2. Related Background Art

Technologies have been developed vigorously relating to a rewritable high-density recording medium in which magnetic microdomains are recorded in a magnetic thin film by utilizing the thermal energy of a laser beam and from which signals are reproduced by utilizing magneto-optical effects. In such a medium, reproduction characteristics are impaired in the case where diameters and intervals of recording bits functioning as recording magnetic domains decrease relative to a beam diameter of a light beam converged onto the medium. This is because a beam spot formed by converging the light beam onto a target recording bit also falls on adjacent recording bits.

Therefore, the super-resolution reproducing method, the reproducing method in which magnetic domains are enlarged so as to be reproduced (hereinafter referred to as magnetic-domain enlarging-reproducing method) by utilizing the domain wall movement, etc. have been proposed. The following description will depict the magnetic-domain enlarging-reproducing method disclosed by JP 6(1994)-290496A, while referring to FIG. 8. According to the magnetic-domain enlarging-reproducing method, amplitudes of reproduction signals are widened by enlarging-recording magnetic microdomains in a recording layer 83. It should be noted that arrows in the drawing indicate directions of sub-lattice magnetizations of transition metals. However, a part 89 in an intermediate layer 82 loses the magnetic order since it is heated to a Curie temperature or above.

Figure 8:
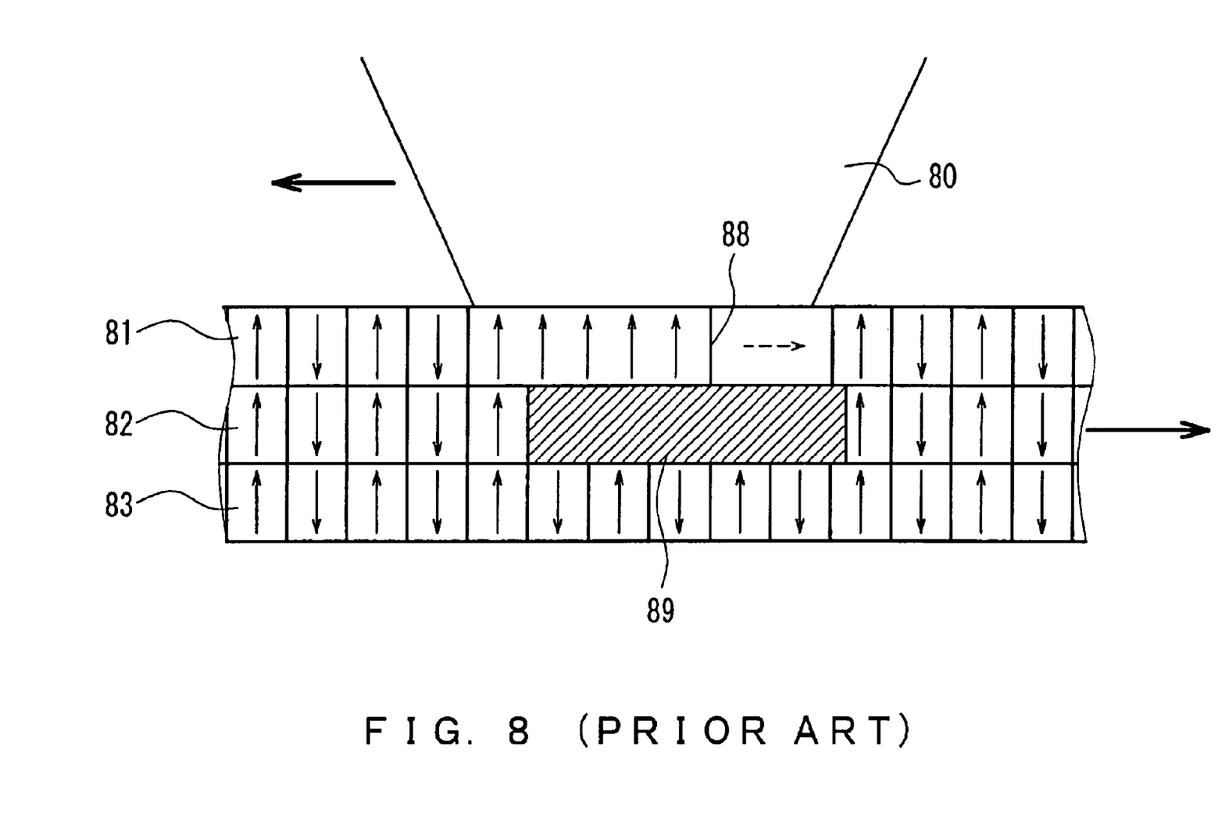
FIG. 8 is a view for explaining principles of reproduction of information of a conventional magneto-optical recording medium to which the domain-wall-moving-type magnetic-domain enlarging technique is applied.

While the magneto-optical recording medium (disk) is irradiated with a laser beam 80, the disk is moved rightward in the drawing. Then, a position at which a film temperature has a maximum value is behind the center of a beam spot in a beam spot moving direction (leftward direction in the drawing). A domain-wall-energy density $\sigma_1$ in a magnetic-domain enlarging layer 81 usually decreases as the temperature rises. Therefore, if there is a temperature gradient, the magnetic-wall-energy density $\sigma_1$ is lower on the high temperature side. A force $F_1$ expressed by the following equation is applied to domain walls in respective layers that are present at a position x on the medium:

$$F_1 = -d\sigma_1/dx$$

The force $F_1$ is applied so as to move the domain wall toward a portion having a lower domain-wall-energy density, that is, to the high temperature side. Therefore, in the magnetic-domain enlarging layer 81 having a lower domain-wall coercive force, a domain wall 88 is moved to the high temperature side by the force $F_1$ in a region where the intermediate layer 82 reaches a Curie temperature thereof and the exchange coupling is broken. Herein, the movement of the domain wall is sufficiently quicker than the movement of the medium. Thus, the magnetic domain stored in the recording layer 83 is transferred and magnified to the magnetic-domain enlarging layer 81.

The foregoing conventional magnetic-domain enlarging-reproducing method, however, has a drawback in that magnetic domains in adjacent tracks inhibit smooth movement of a domain wall in the track extending direction. Therefore, a technique in which the domain wall movement in a radial direction is prevented by magnetic separation of a target track from the adjacent tracks has been proposed. Two main schemes are shown below:

(i) forming rectangular guide grooves on a substrate, so as to separate tracks with the grooves; and (ii) annealing recording layers in adjacent tracks, so that the layers have in-plane magnetization.

However, in the scheme (i), films actually are formed in step-like portions thereby connecting magnetic layers with each other. Therefore, it is difficult to achieve complete magnetic separation. As to the scheme (ii), an industrially applicable scheme has not been known, and the annealing of recording layers of adjacent tracks is disadvantageous with a view to high-density recording.

SUMMARY OF THE INVENTION

Therefore, with the foregoing in mind, it is an object of the present invention to improve a magneto-optical recording medium to which the magnetic-domain enlarging-reproducing method is applied, or more specifically, to provide a magneto-optical recording medium in which magnetic influences from adjacent tracks are suppressed when information is reproduced by utilizing magnetic-domain enlargement.

A magneto-optical recording medium of the present invention includes a substrate, and a multilayer film formed on the substrate, and the multilayer film includes a first magnetic layer, a second magnetic layer, and a third magnetic layer. The second magnetic layer is interposed between the first and third magnetic layers and has a Curie temperature $T_{C2}$ that is lower than a Curie temperature $T_{C1}$ of the first magnetic layer and a Curie temperature $T_{C3}$ of the third magnetic layer, and the third magnetic layer is a perpendicular magnetization film. In the medium, in at least a part of a temperature range lower than the Curie temperature $T_{C2}$, the first magnetic layer is exchange-coupled with the second magnetic layer so as to be perpendicularly magnetized, and a magnetization of the third magnetic layer is transferred to the first magnetic layer via the second magnetic layer due to the exchange coupling. The second magnetic layer is in an in-plane magnetization state at room temperature, and makes a transition to a perpendicular magnetization state in a temperature range from a critical temperature $T_{CR}$ that is higher than room temperature to the Curie temperature $T_{C2}$.

In the present specification, "room temperature" indicates 20° C.

A magneto-optical recording medium reproducing method of the present invention is a method for reproducing information from the foregoing magneto-optical recording medium. The method includes (i) irradiating the medium with a laser beam while the laser beam is moved with respect to the surface of the medium so as to form a masked region and a perpendicular magnetization region, wherein the masked region is a region heated to a temperature not lower than the Curie temperature $T_{C2}$ of the second magnetic layer and not higher than the Curie temperature $T_{C1}$ of the first magnetic layer and the Curie temperature $T_{C3}$ of the third magnetic layer, and the perpendicular magnetization region is a region where the first magnetic layer is exchange-coupled with the second magnetic layer so as to be perpendicularly magnetized and a magnetization of the third magnetic layer is transferred to the first magnetic layer via the second magnetic layer due to the exchange coupling, wherein a domain wall of the first magnetic layer is moved from the perpendicular magnetization region to the masked region, thereby causing a magnetic domain in the perpendicular magnetization region to be enlarged, and (ii) detecting a change in a polarization plane of a reflected light of the light beam from the enlarged magnetic domain.

DETAILED DESCRIPTION OF THE INVENTION

The following description will depict a preferred embodiment of the present invention, while referring to drawings.

Figure 1:
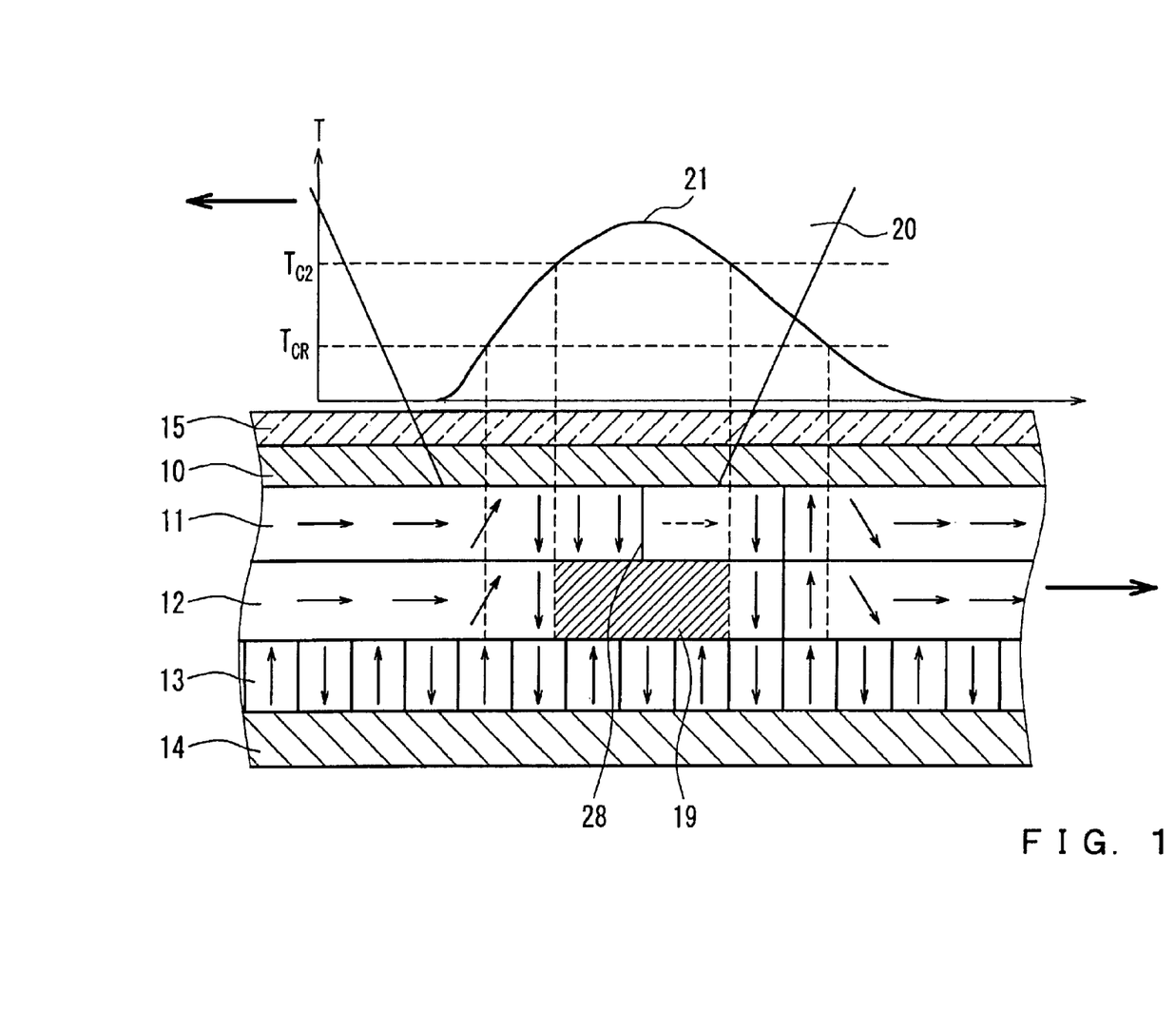
FIG. 1 is a cross sectional view of an example of a magneto-optical recording medium of the present invention, along with magnetization states of magnetic films of the same and a temperature distribution therein.
Figure 2:
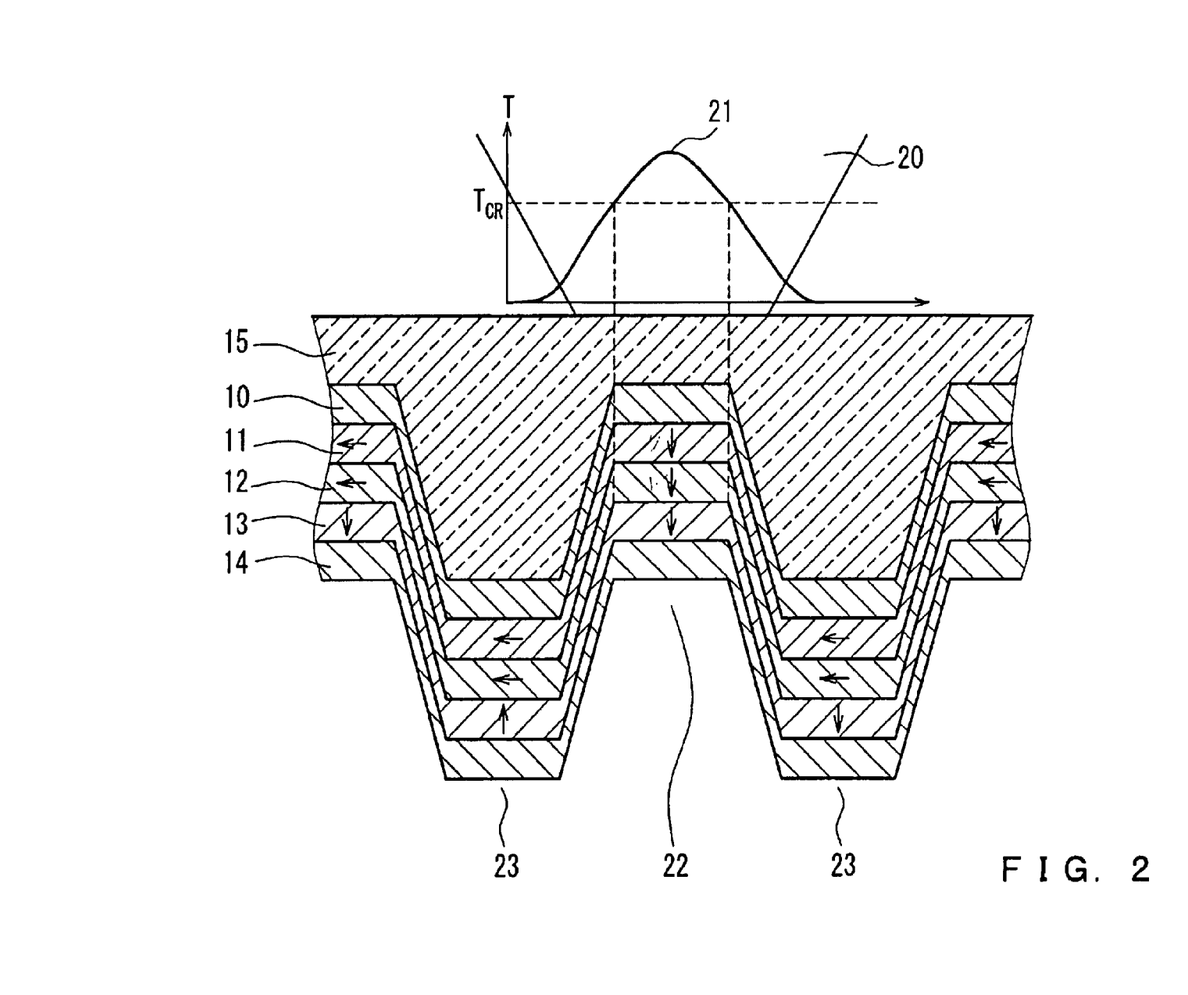
FIG. 2 is a cross sectional view taken so as to cross a perpendicular magnetization region of the medium shown in FIG. 1.

In a medium shown in FIGS. 1 and 2, a magnetic multilayer film is provided on a substrate 15, with an interference layer 10 interposed therebetween. The magnetic multilayer film includes a first magnetic layer (magnetic-domain enlarging layer) 11, a second magnetic layer (intermediate layer) 12, and a third magnetic layer (recording layer) 13 that are provided in the stated order from the substrate side, in contact with each other. On the magnetic multilayer film, a protective film 14 is provided.

The intermediate layer 12 is maintained in an in-plane magnetization state at room temperature. Therefore, at room temperature, the magnetic-domain enlarging layer 11 and the recording layer 13 are not exchange-coupled with each other at room temperature. The intermediate layer makes the transition from the in-plane magnetization state to a perpendicular magnetization state when the temperature thereof exceeds a critical temperature $T_{CR}$ of the intermediate layer due to irradiation with a laser beam 20. Thus, the magnetic-domain enlarging layer 11 and the recording layer 13 are exchange-coupled with each other via the intermediate layer 12 at a temperature in a range between the critical temperature $T_{CR}$ and a Curie temperature $T_{C2}$ of the intermediate layer. In a region heated further to the Curie temperature $T_{C2}$ or above, the intermediate layer loses the magnetic order. Therefore, in this region (masked region) 19, the exchange coupling between the magnetic-domain enlarging layer 11 and the recording layer 13 is broken again. As a result, a domain wall 28 in the magnetic-domain enlarging layer 11 in a region where the exchange coupling is established (in a perpendicular magnetization region) is moved to the high temperature side by the aforementioned force $F_1$, thereby enlarging the magnetic domain.

An adjacent track (land 23 in FIG. 2) has a lower temperature than that of a track as a target of reproduction (groove 22 in FIG. 2). Therefore, as shown in FIG. 2, even if the intermediate layer 12 of the target track from which signals are to be reproduced has a temperature in a range between the critical temperature $T_{CR}$ and the Curie temperature $T_{C2}$, the intermediate layer 12 and the magnetic-domain enlarging layer 11 in adjacent tracks and tapered land side-walls are maintained in the in-plane magnetization state. Thus, magnetic connection with the adjacent tracks is interrupted. Moreover, magnetostatic coupling forces due to floating magnetic fields from adjacent tracks are suppressed, and hence, crosstalk is reduced as well. Furthermore, since in a beam spot of the laser beam, the magnetic-domain enlarging layer except for the magnetic domain to be reproduced is in the in-plane magnetization state, noises unnecessary for reproduced signals can be suppressed.

As described above, by continuously irradiating a medium having an intermediate layer characterized as above with a laser beam while moving the laser beam in the track extending direction relative to the medium, a temperature distribution 21 in which the temperature varies from a low temperature lower than $T_{CR}$ to a high temperature not lower than $T_{C2}$ and lower than $T_{C1}$ and $T_{C3}$ is formed locally in the magnetic multilayer film. This allows a magnetic domain to be enlarged from the perpendicular magnetization region to the masked region, while avoiding the magnetic influences from the adjacent tracks, thereby allowing information to be reproduced from the enlarged magnetic domain. As the method for irradiating a medium with a laser beam and the method for reproducing information according a reflected light from an enlarged magnetic domain, methods that have been used conventionally may be applied.

A difference between $T_{C2}$ and $T_{CR}$ preferably is less than 100° C., and particularly preferably less than 80° C. In the case where the difference between $T_{CR}$ and $T_{C2}$ exceeds 100° C., perpendicular magnetization anisotropy in the vicinity of $T_{CR}$ tends to decrease. On the other hand, in the case where the difference between $T_{C2}$ and $T_{CR}$ is excessively small, a region where magnetic domains are transferred from the recording layer to the magnetic-domain enlarging layer is narrowed excessively, and this causes reproduction signals to be deficient in some cases. Therefore, a difference between the Curie temperature $T_{C2}$ and the critical temperature $T_{CR}$ preferably exceeds 20° C. Consequently, a particularly preferable range of $T_{CR}$ can be expressed as:

$$T_{C2}-80<T_{CR}<T_{C2}-20$$

The intermediate layer preferably has a compensation temperature that is not lower than room temperature and not higher than $T_{CR}$, so as to exhibit the in-plane magnetization state at room temperature and a perpendicular magnetization state at a temperature not lower than the critical temperature $T_{CR}$. The Curie temperature $T_{C2}$ of the intermediate layer preferably is not lower than 130° C. and not higher than 160° C. A difference between a Curie temperature $T_{C1}$ of the magnetic-domain enlarging layer and $T_{C2}$ preferably is not less than 100° C. The carrier value of signals is related to the Curie temperature, and a greater carrier value is expected as the Curie temperature is higher. However, in the case of the medium of the present invention, if a magnetic film with an excessively high Curie temperature is used for the magnetic-domain enlarging layer, the domain-wall coercive force excessively increases, thereby possibly hindering the obtaining of sufficient signals.

As shown in the drawing, the magnetic-domain enlarging layer (first magnetic layer) and the intermediate layer (second magnetic layer) may be provided in contact with each other. This makes the magnetic coupling therebetween stronger as compared with, for instance, the case where they are magnetostatically coupled with each other with a non-magnetic layer interposed therebetween, thereby allowing even short recording marks with a length of about 0.10 μm to be formed and transferred stably.

Materials for the intermediate layer (second magnetic layer) are not limited particularly, and any alloy selected from GdFe, GeFeCo, GeFeAl, GdFeCr, GdFeCoCr, GdFeSi, GdFeCoSi, GeFeCoAl, TbFe, TbFeCo, TbFeAl, TbFeCr, TbFeCoCr, TbFeSi, TbFeCoSi, and TbFeCoAl is suitable. Any one may be selected from the above and its composition may be adjusted so that a Curie temperature $T_{C2}$ and a critical temperature $T_{CR}$ are obtained in appropriate ranges, respectively. Examples of appropriate compositions are shown below.

The intermediate layer may be, for instance, an alloy expressed by a composition formula given as:

$(Gd_xFe_{1-x})_{1-y}M_y$, where M represents at least one selected from Cr and Si, x represents a numerical value of not less than 0.15 and not more than 0.40, and y represents a numerical value of not less than 0 and not more than 0.30. It should be noted that in a composition formula a proportion of the composition is expressed by atomic percent (at %), following the usual practice. Alternatively, the intermediate layer may be, for instance, an alloy expressed by a composition formula given as:

$(Tb_xFe_{1-x})_{1-y}M_y$, where M, x, and y represent the same as described above. It should be noted that a content of a rare earth element (Gd, Tb) preferably is 23 at % to 27 at % so as to cause the intermediate layer to have a compensation temperature of not lower than room temperature and not higher than the critical temperature $T_{CR}$.

To form the recording layer (third magnetic layer), a material having great perpendicular magnetic anisotropy and a great coercive force so as to form very small recording bits and to ensure stable storage of formed recording bits is suitable, for instance, TbFeCo, DyFeCo, TbDyFeCo, etc. A perpendicular magnetization film, such as a film made of garnet, or a Pt/Co or Pd/Co magnetic artificial lattice film, may be used. Recorded information is maintained as upward/downward magnetization directions in respective magnetic domains in the recording layer. It should be noted that the coercive force of the recording layer preferably is greater than the coercive force of the first magnetic layer at room temperature, and more specifically, it preferably is not less than 3 kOe (approximately 238.8 kA/m).

The magnetic-domain enlarging layer (first magnetic layer) preferably is made of a material that ensures a smaller domain-wall coercive force and a greater degree of the domain wall movement, as compared with the first and third magnetic layers. More specifically, the layer may be configured so as to have a domain-wall coercive force at a low level such that, in the masked region that has been heated locally and thereby has a temperature above the Curie temperature $T_{C2}$, a domain wall is permitted to move from a perpendicular magnetization region that is magnetized perpendicularly by the exchange coupling with the second magnetic layer to the masked region. For the magnetic-domain enlarging layer, a rare earth-transition metal amorphous alloy with a small perpendicular magnetic anisotropy is suitable, such as GdCo, GdFeCo, GdFe, NdGdFeCo, etc. A material used for bubble memory such as garnet may be used. Besides, thermal characteristics thereof may be adjusted by adding a metal layer made of, for instance, Al, AlTa, AlTi, AlCr, or Cu. A protective coating made of a polymer resin may be added.

In addition to the foregoing magnetic layers, an interference layer to be described later may be added as required. An interference layer preferably is provided in order to improve the magneto-optical effects and to protect the magnetic layers, and for instance, a transparent dielectric material such as $Si_3N_4$, AlN, AlSiN, $SiO_2$, SiO, ZnS, or $MgF_2$ is suitable.

The method for forming the foregoing layers is not limited, and the layers may be formed by any appropriate one of various sputtering methods, vapor deposition methods, etc.

To form a transparent substrate, glass, polycarbonate-based resin, etc. may be used, for instance. For tracking servo, the transparent substrate may be a substrate with a guide groove, to which the continuous servo method can be applied, or alternatively, it may be a substrate without guide grooves, to which the sample servo method is applied. It should be noted that in the case where guide grooves are formed, signals may be recorded/reproduced with respect to both lands and grooves, or alternatively, signals may be recorded/reproduced with respect to only either lands or grooves.

The above-described magneto-optical recording medium to which the magnetic-domain enlarging method is applied is produced basically so as to satisfy the following requirements:

(i) the magneto-optical recording medium has a recording layer 13 that is a perpendicular magnetization film that stably maintains magnetic microdomains in a temperature range from room temperature to a temperature for reproduction;

(ii) the recording layer 13, the intermediate layer 12, and the magnetic-domain enlarging layer 11 are exchange-coupled with one another in at least a part of a temperature range from room temperature to the Curie temperature $T_{C2}$;

(iii) the exchange-coupling from the recording layer 13 to the magnetic-domain enlarging layer 11 is broken in the region (masked region) 19 where the intermediate layer 12 has a temperature above its Curie temperature, thereby having lost a magnetic order;

(iv) since the domain-wall coercive force of the magnetic-domain enlarging layer 11 is small and a domain-wall-energy gradient is generated by a temperature gradient, in the masked region 19, the domain wall 28 moves from a magnetic domain transferred from the recording layer 13 as a point of origin. Consequently, in the masked region, a magnetic domain in the magnetic-domain enlarging layer is enlarged, and the magnetizations therein are directed in the same direction.

It should be noted that the medium of the present invention is not limited to that having a configuration completely satisfying the foregoing requirements, but various types of media are applicable. Some specific examples of media of such types will be described below.

First Embodiment

Targets of Si doped with B, GdFeCo, TbFe, Fe, Co, and AlTi were placed in a direct current magnetron sputtering device. On a substrate holder of the device, a polycarbonate disk having guide grooves with a width of 0.6 μm and a depth of 55 nm for tracking use was disposed. The substrate having lands and grooves was obtained by injection molding.

Then, a chamber of the device was vacuumed by a cryopump so as to have a high vacuum of not more than $1 \times 10^{-5}$ Pa, and Ar gas was introduced into the chamber while the vacuuming was continued until a degree of vacuum of 0.3 Pa was obtained. Subsequently, while the substrate was rotated, a 80 nm thick SiN layer as an interference layer, a 40 nm thick GdFeCoAlTi layer ($T_{C1}$= 290° C.) as a magnetic-domain enlarging layer, a 10 nm thick GdFeAl layer ($T_{C2}$=150° C., $T_{CR}$=100° C., composition formula: $Gd_{0.25}Fe_{0.55}A_{0.20}$) as an intermediate layer, a 80 nm thick TbFeCo layer ($T_{C3}$=300° C.) as a recording layer, and a 50 nm thick SiN layer as a protective layer were formed successively on the substrate, to obtain a medium A. It should be noted that the SiN layer was formed by direct current reactive sputtering in which $N_2$ gas was introduced into the chamber along with the Ar gas. Furthermore, a medium B was obtained through the same process as above except that a 10 nm thick TbFe layer (Curie temperature= 150° C.) was formed as the intermediate layer. The TbFe layer was a magnetic layer that is in the perpendicular magnetization state at room temperature, as shown in FIG. 8.

As to both the media thus obtained, recording/reproducing characteristics were measured. For evaluation of characteristics, an optical system of a generally-used magneto-optical disk recording/reproducing device was used. The optical system was provided with a light source with a laser wavelength of 660 nm. Recording/reproduction was performed by driving the medium at a linear velocity of 1.5 m/s. In recording, the medium was irradiated with a 33%-duty pulse laser beam at 10 mW, while a magnetic field was modulated by 350 Oe (approximately 27.86 kA/m), so that repetitive patterns with upward and downward magnetizations were formed according to the modulation of the magnetic field. The recording was carried out by heating the medium to its Curie temperature or above. Magnetic domains, each having a recording length of 0.2 μm, were formed in the media A and B by the foregoing method. It should be noted that a medium C was prepared as well, which was the same as the medium B except that adjacent tracks on both sides of a target track were annealed with a DC beam at 10 mW. Subsequently, the read power properties of these media were measured so that magnetic-domain enlargement reproduction was evaluated as to the media.

Figure 3:
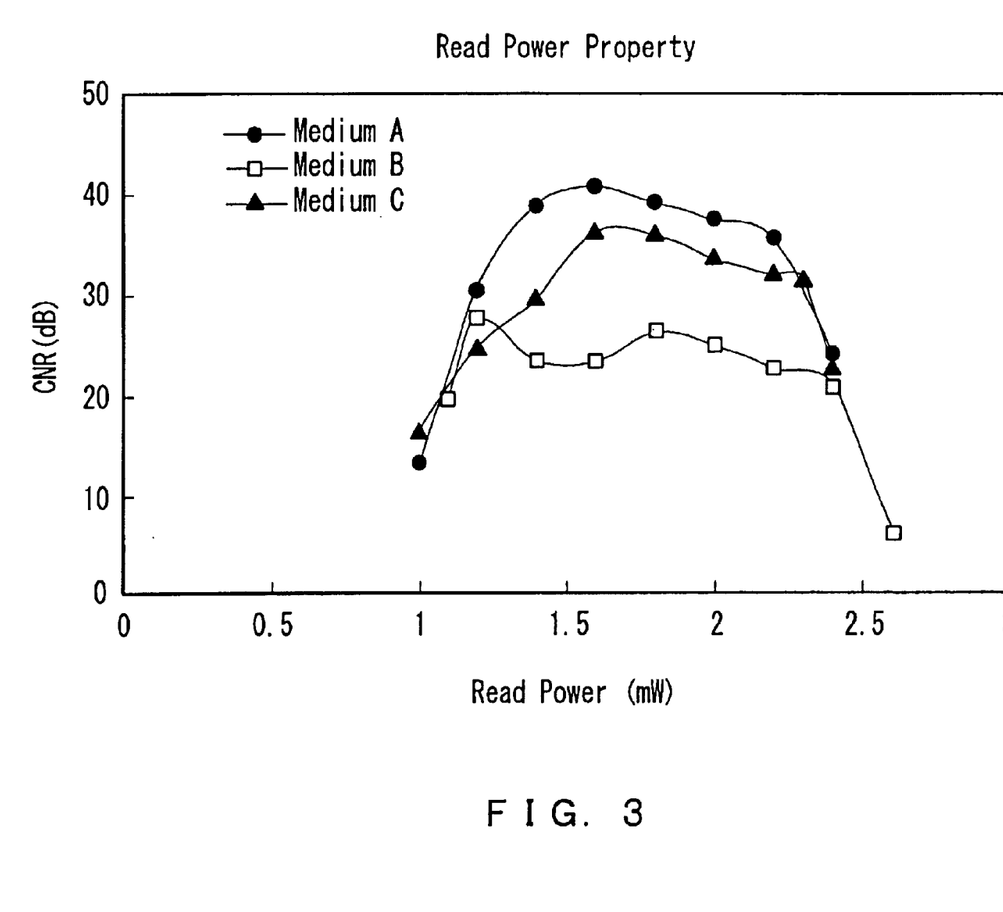
FIG. 3 is a view illustrating the relationship between a read power and a C/N ratio of the magneto-optical recording medium of the present invention, in comparison with that of a conventional medium.

The read power dependency of signal-to-noise ratios (C/N ratios) determined as results of the measurement is shown in FIG. 3.

In the medium A, a portion of the films was heated to the Curie temperature $T_{C2}$ of the intermediate layer when the read power was in the vicinity of 1 mW, and the domain wall movement occurred in the magnetic-domain enlarging layer when the read power was not less than 1 mW. Therefore, signals of a mark length of 0.2 μm corresponding to a cycle that is lower than a diffraction limit of light were reproducible, and a C/N ratio of 40 dB was measured. On the other hand, as to the medium B, since signals at a 20 dB level were detected, it can be seen that the magnetic-domain enlargement occurred, but the domain wall movement occurred not only in the laser beam traveling direction but also to adjacent tracks and tapered land side-walls, thereby hindering stable reproduction of signals.

The medium C in which the adjacent tracks were annealed exhibited a better C/N ratio of approximately 36 dB. However, considering that a higher C/N ratio was obtained from the medium A, it can be seen that a magnetic domain was enlarged to a larger area. The difference between the properties of the two media was more significant in the case where these media had a smaller track pitch. This implies that magnetic domains were magnified not only in the track extending direction but also in the track width direction.

In the media B and C, though the magnetic-domain enlarging layer did not have a coercive force itself, magnetic moments therein were aligned in the same direction as those in the recording layer due to exchange coupling, in a temperature range from room temperature to $T_{C2}$. On the other hand, as to the medium A, it can be considered that the aforementioned magnetic-domain enlargement was enabled since magnetization directions of the recording layer were not transferred to the magnetic-domain enlarging layer in the temperature range from room temperature to $T_{CR}$.

It should be noted that since GdFeCoAlTi used for the magnetic-domain enlarging layer has an extremely great domain-wall-energy density, it is disadvantageous from the viewpoint of energy efficiency to enlarge domain wall areas by forming magnetic microdomains in the layer. By utilizing the magnetic-domain enlarging layer with a great domain-wall-energy density, a driving force for enlarging magnetic domains to sizes suitable for their stable presence is increased.

Second Embodiment

Figure 4:
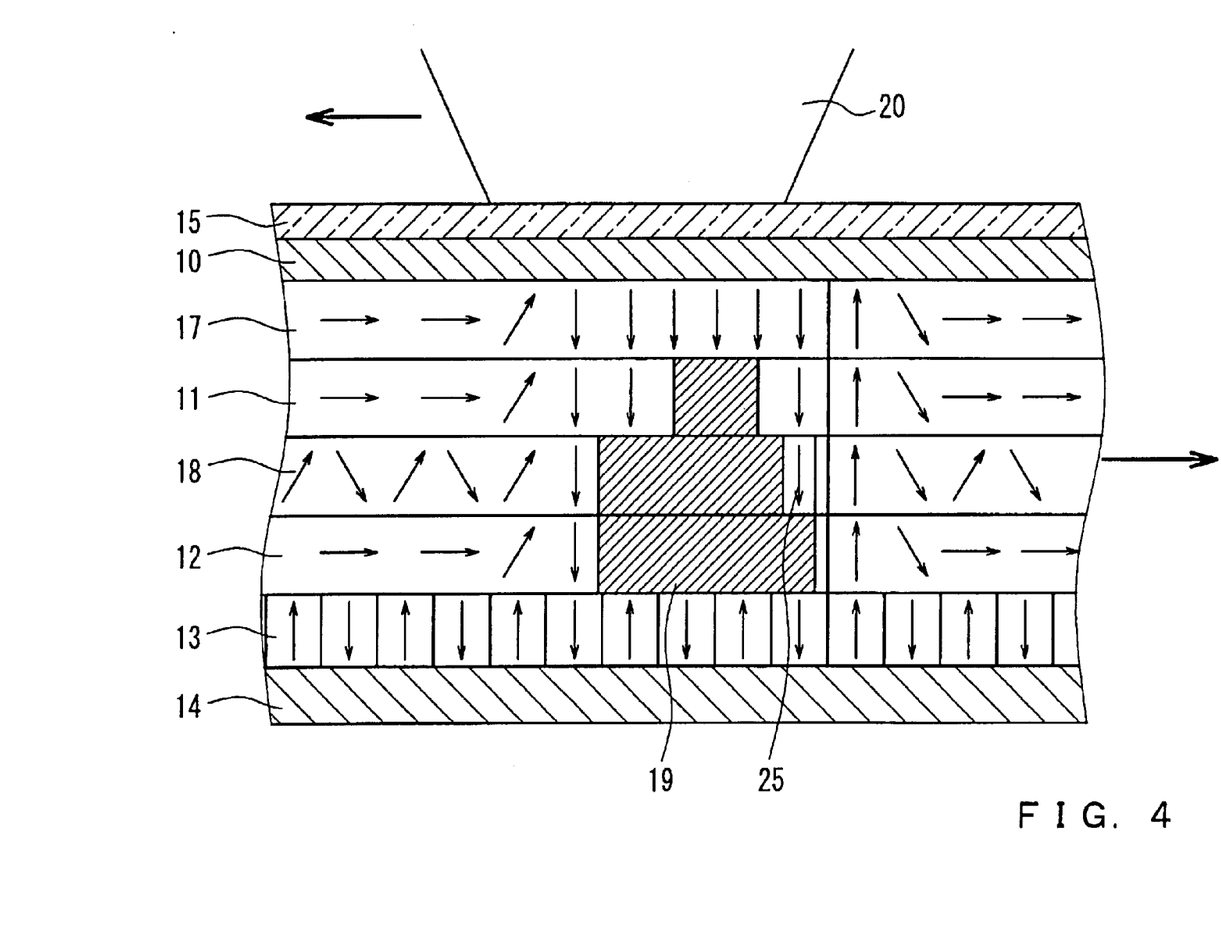
FIG. 4 is a cross sectional view of another example of a magnetooptical recording medium of the present invention, along with magnetization states of magnetic films of the same and a temperature distribution therein.

In a magneto-optical recording medium shown in FIG. 4, in a magnetic multilayer film provided on a substrate 15 with an interference layer 10 interposed therebetween, a control layer 18 is provided between a magnetic-domain enlarging layer 11 and an intermediate layer 12. Furthermore, a reproduction layer 17 is provided on a substrate side of the magnetic-domain enlarging layer 11.

The reproduction layer 17 (a magnetic film B in the first magnetic layer) may be made of a rare earth-transition metal amorphous alloy, like the other magnetic layers. However, a material having a Curie temperature $T_{C5}$ higher than that of the magnetic-domain enlarging layer 11 ($T_{C5}$>$T_{C1}$) is preferable, and GdCo, GdFeCo, GdFeCoAl, GdFe, NdGdFeCo, etc., is applicable, for instance.

In the case where the reproduction layer 17 is provided on a laser-beam-incident side of the magnetic-domain enlarging layer 11, signals can be reproduced with greater amplitudes. Considering the domain wall movement, the magnetic-domain enlarging layer 11 preferably is made of a material having a great temperature gradient of the domain-wall-energy density, and the domain-wall-energy density exhibits maximum variation at a temperature immediately below the Curie temperature. Therefore, a material having a relatively low Curie temperature is suitable for forming the magnetic-domain enlarging layer. The Curie temperature $T_{C1}$ in the case where the reproduction layer is provided preferably is not lower than $(T_{C2}+20)°$ C. and not higher than $(T_{C2}+120)°$ C., though this depends on the specific intermediate layer. By thus lowering $T_{C1}$ to the vicinity of $T_{C2}$, the domain wall movement can be caused with a low read power, and hence, a wider read power margin can be obtained. However, a magnetic material having a low Curie temperature has a small Kerr rotation angle, and a small Kerr rotation angle leads to a decrease in a carrier value of signals. Therefore, the amplitude can be amplified in the case where the first magnetic layer is made of multilayer films including, in an order from the second magnetic layer side, a magnetic film A functioning as a magnetic-domain enlarging layer and a magnetic film B (reproduction layer) that has a higher Curie temperature and in which a domain wall moves upon the domain wall movement in the magnetic-domain enlarging layer. A plurality of films may be laminated to obtain the reproduction layer.

The control layer 18 as a fourth magnetic layer preferably is made of a magnetic material having a Curie temperature $T_{C4}$ lower than the Curie temperature $T_{C1}$ of the magnetic-domain enlarging layer 11 and higher than the Curie temperature $T_{C2}$ of the intermediate layer 12 ($T_{C2}<T_{C4}<T_{C1}$), and having a great domain-wall coercive force. This layer more preferably is made of a film that has a compensation temperature in the vicinity of room temperature (for instance, 20° C. to 60° C.) and that is in the perpendicular magnetization state at room temperature.

In some cases, as shown in FIG. 4, magnetic moments of the control layer 18 are not completely perpendicular, even in the case where the layer is made of a perpendicular magnetization film. In the state shown in FIG. 4, since the layer is thinly formed as compared with the magnetic-domain enlarging layer 11 and the intermediate layer 12, the layer has weakened magnetic anisotropy, when being interposed between magnetic layers in the in-plane magnetization state on the upper and lower sides. The control layer preferably has a thickness of, for instance, 3 nm to 20 nm.

The following description will show specific examples of the foregoing medium. Here, a polycarbonate substrate having a track pitch of 0.8 μm, recording-use grooves with a depth of 55 nm and a width of 0.6 μm was used. On the substrate 15, an 80 nm thick SiN layer as an interference layer 10, a 20 nm thick GdFeCoAl layer ($T_{C5}$=290° C.) as a reproduction layer 17, a 20 nm thick GdFeCoAl layer ($T_{C1}$=240° C.) as a magnetic-domain enlarging layer 11, a 5 nm thick TbFeCo layer ($T_{C4}$=170° C.) as a control layer 18, a 10 nm thick TbFeAl layer ($T_{C2}$=160° C., $T_{CR}$=90° C., composition formula: $Tb_{0.25}Fe_{0.48}Al_{0.27}$) as an intermediate layer 12, a 80 nm thick TbFeCo layer ($T_{C3}$=310° C.) as a recording layer 13, and a 50 nm thick SiN layer as a protective layer 16 were formed successively on the substrate through the same process as that in the first embodiment, to obtain a medium D. Further, a medium E was obtained by forming the foregoing layers in the same manner except that the reproduction layer and the control layer were not formed.

Figure 5:
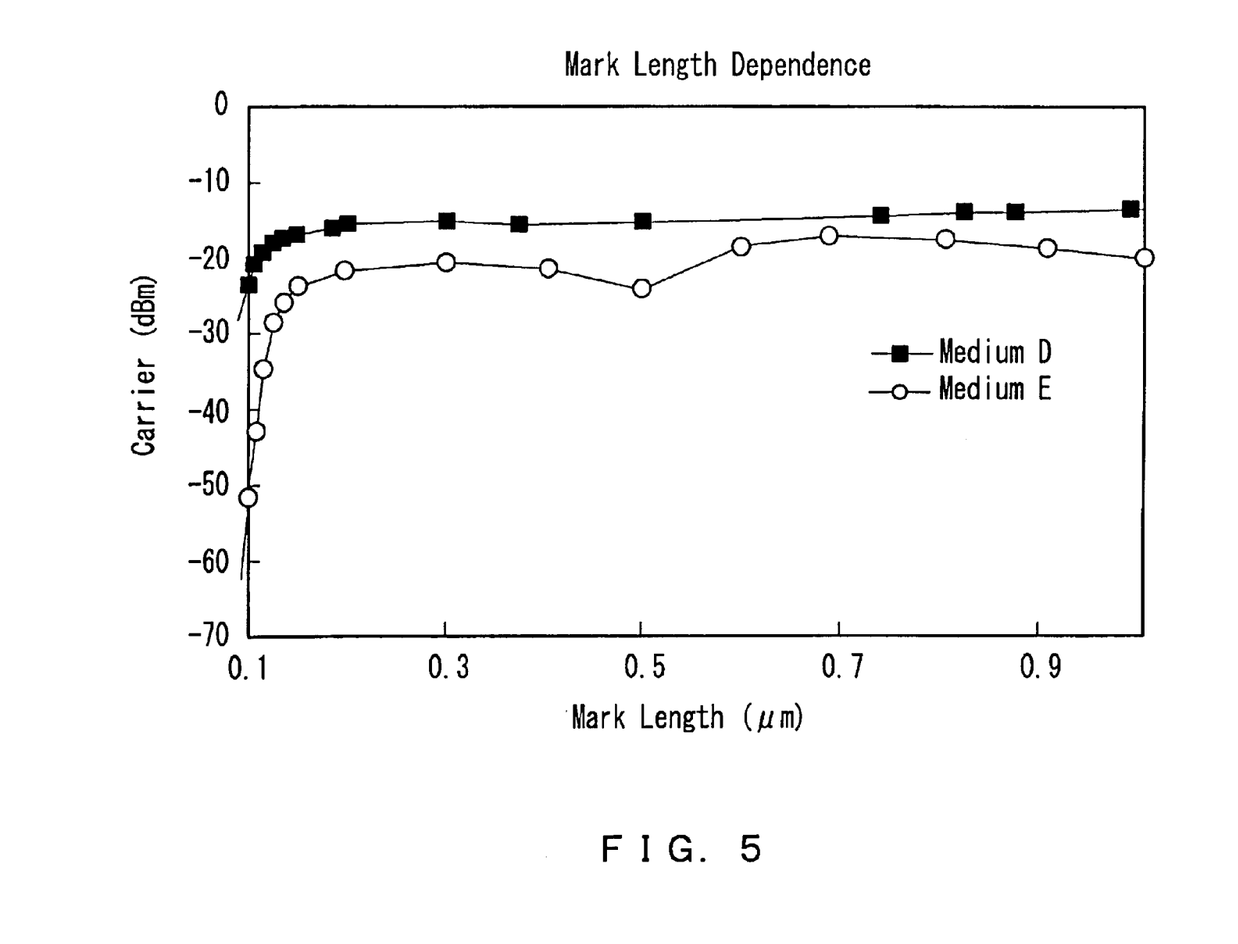
FIG. 5 is a view illustrating the relationship between a mark length and a carrier value of the magneto-optical recording medium of the present invention.

As to the respective media, recording/reproduction signals were measured, by utilizing only the grooves. As to the media D and E, carriers were measured by varying a recording mark length, and the results of the measurement are shown in FIG. 5. Note that the read power was set to 2.0 mW in the both cases.

With the interposition of the reproduction layer 17 whose Curie temperature was 50° C. higher than that of the magnetic-domain enlarging layer, a carrier value of the medium D was improved throughout the range. Furthermore, with the interposition of the control layer 18 in the medium D, the decrease in the carrier of the medium D that occurred at a specific recording mark length was prevented. The foregoing decrease is called "ghost signal", and occurs in a specific frequency signal.

The driving power for the domain wall movement in the magnetic-domain enlarging layer 11 utilizes a temperature gradient ahead in the traveling direction of the laser beam 20. However, a domain wall driving force due to a temperature gradient also is induced behind in the traveling direction of the laser beam 20, though it is a more gradual gradient. The driving force generates a ghost signal, but the provision of the control layer allows the domain wall movement occurring behind the laser beam to be suppressed. As shown in FIG. 4, a magnetic order is generated in the control layer 18 earlier than in the intermediate layer, since the control layer 18 has a Curie temperature higher than that of the Curie temperature of the intermediate layer 12. This magnetic-order-generated portion 25 is exchange-coupled with the magnetic-domain enlarging layer 11. At a temperature at which the transfer from the recording layer occurs, that is, a temperature in the vicinity of the Curie temperature of the intermediate layer 12, the control layer 14 has a high domain-wall-energy density, thereby suppressing the domain wall movement in the magnetic-domain enlarging layer 11 that is exchange-coupled with the foregoing control layer. Thus, in the control layer 18, the region 25 where a magnetic order is recovered earlier is formed behind the region 19 in the laser beam 20 traveling direction where the intermediate layer has lost a magnetic order, whereby an effect of suppressing the recording mark dependency of the carrier value can be achieved.

It should be noted that herein the intermediate layer 12 was arranged so as to have a Curie temperature of 160° C., but the domain wall movement was confirmed in a range of 120° C. to 200° C. However, to obtain a higher C/N ratio, the Curie temperature of the intermediate layer in a range of 130° C. to 160° C. was appropriate.

Third Embodiment

Figure 6:
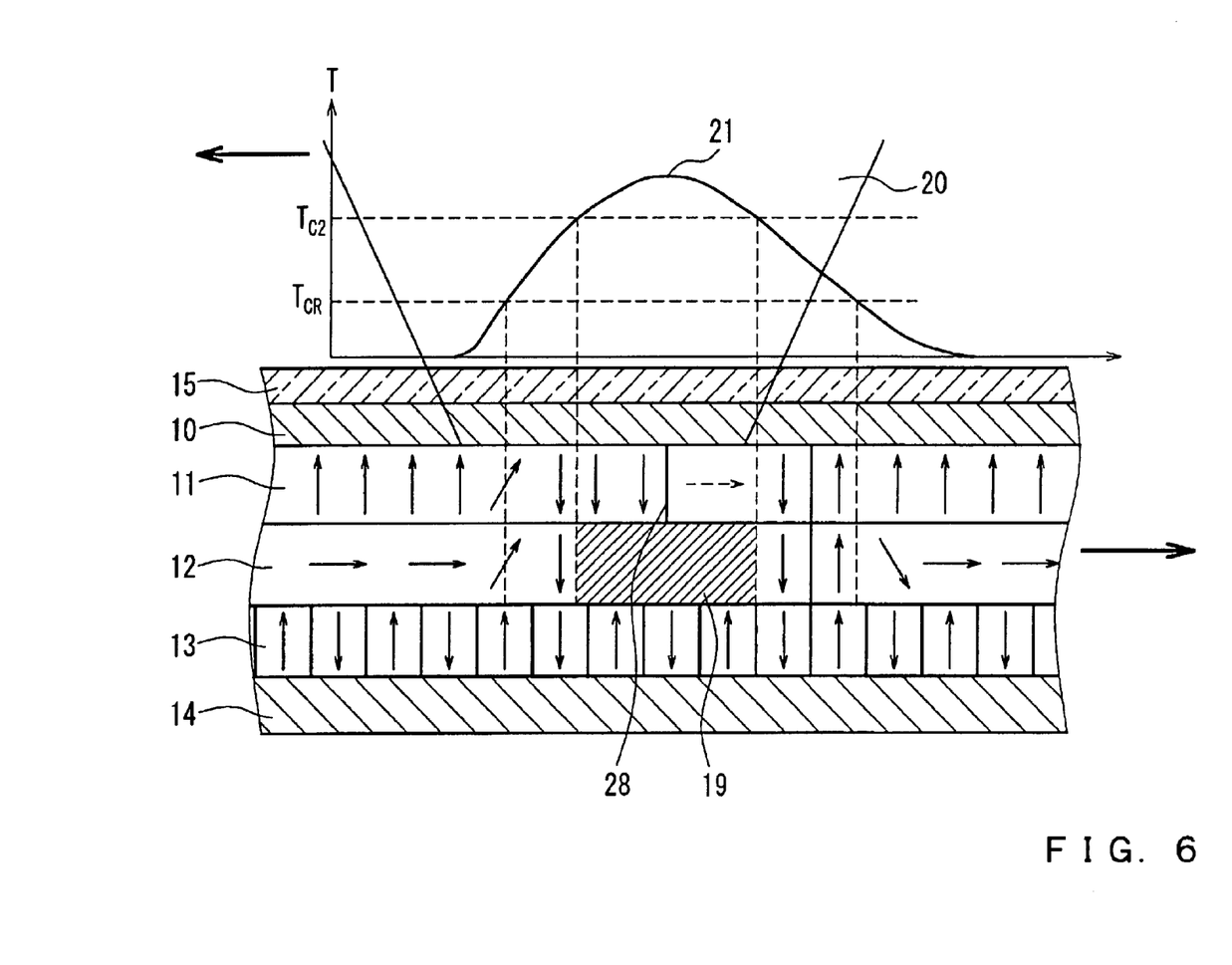
FIG. 6 is a cross sectional view of still another example of a magneto-optical recording medium of the present invention, along with magnetization states of magnetic films of the same and a temperature distribution therein.

A magneto-optical recording medium shown in FIG. 6 is the same as that in the first embodiment having a magnetic-domain enlarging layer that is in the in-plane magnetization state at room temperature, except that the magnetic-domain enlarging layer 11 is a perpendicular magnetization film at room temperature. In the present embodiment, the compensation temperature of the magnetic-domain enlarging layer 11 is adjusted so that the layer is maintained in the perpendicular magnetization state in a temperature range from room temperature to its Curie temperature $T_{C2}$.

Further, the magnetic-domain enlarging layer 11 is made of a magnetic thin film material having a domain-wall-energy density al even at room temperature so that a driving force $F_1$ exerted on a domain wall present at a certain point x is increased. Therefore, the magnetic-domain enlarging layer is in a state in which magnetic domains hardly are formed. Accordingly, as shown in the drawing, no domain wall exists in the magnetic-domain enlarging layer 11 at regions where the temperature is not higher than a critical temperature $T_{CR}$.

In this medium, when the intermediate layer 12 is heated, thereby making a transition to the perpendicular magnetization state, an exchange coupling force is exerted between the magnetic-domain enlarging layer 11 and the recording layer 13. In this state, whether or not a magnetic domain is transferred to the magnetic-domain enlarging layer depends on which energy is smaller, an energy for forming a domain wall between the magnetic-domain enlarging layer and the recording layer, or an energy for forming a domain wall in the magnetic-domain enlarging layer. Transfer of a magnetic domain to the magnetic-domain enlarging layer is enabled by increasing an interface domain wall energy between the magnetic-domain enlarging layer and the recording layer. As one of techniques for transferring information to the magnetic-domain enlarging layer 11, the compensation temperature of the intermediate layer may be set in the vicinity of a reproduction temperature (for instance, higher than $(T_{C2}-40)°$ C. and lower than $(T_{C2}-20)°$ C.). More specifically, a content of rare earth elements therein such as Gd preferably is set to be 25.5 at % to 27 at %, and the Ar pressure upon the formation of the same preferably is set to be lower than that upon the formation of the magnetic-domain enlarging layer or the recording layer. In this medium as well, when the temperature of the multilayer film reaches $T_{C2}$ or above and magnetic moments in the intermediate layer 12 start moving randomly, the exchange coupling is not effected, and the domain wall movement starts in the magnetic-domain enlarging layer 11.

A specific example of the foregoing medium is described below. A polycarbonate substrate of a sample servo type was used as a substrate. On the substrate, an 80 nm thick SiN layer as an interference layer 10, a 20 nm thick GdFeCoAl layer ($T_{C1}=250°$ C.) as a magnetic-domain enlarging layer 11, a 10 nm thick GdFeCoAl layer ($T_{C2}=140°$ C., $T_{CR}=90°$ C., composition formula: $Gd_{0.26}Fe_{0.27}Co_{0.07}Al_{0.4}$) as an intermediate layer 12, a 80 nm thick TbFeCo layer ($T_{C3}=290°$ C.) as a recording layer 13, and a 50 nm thick SiN layer as the protective layer 14 were formed in the stated order successively under the same conditions as those in the first embodiment, whereby a medium F was obtained. It should be noted that the intermediate layer was formed under an Ar pressure (0.5 Pa) that was lower than that upon the formation of the magnetic-domain enlarging layer and the recording layer.

In the sample servo substrate, no physical obstacle is present between adjacent tracks, as compared with the land-groove substrate on which guide grooves are formed. Therefore, in the case where the conventional magnetic-domain enlarging method is applied to a medium in which a sample servo substrate is used, transfer of a magnetic domain in the recording layer to the magnetic-domain enlarging layer occurs also in adjacent tracks. Since the domain wall movement from this transferred magnetic domain is dominant, a signal cannot be reproduced.

In the case where the present invention is applied, in a region that is not irradiated with the laser beam, the intermediate layer 12 is in the in-plane magnetization state, and the transfer of magnetic domains from the recording layer 13 to the magnetic-domain enlarging layer 11 is suppressed. From the medium F, a C/N ratio of 41.2 dB was obtained at a recording mark length of 0.15 μm. Thus, the preferred embodiment of the present invention allows excellent magnetic-domain enlargement to be carried out even in the case where a substrate without guide grooves thereon is used. Considering that the foregoing signal quantity was greater than that in the conventional case, it can be seen that herein also the movement of a domain wall in the medium occurred not only in the track direction but also in the track width direction (radial direction).

Fourth Embodiment

Figure 7:
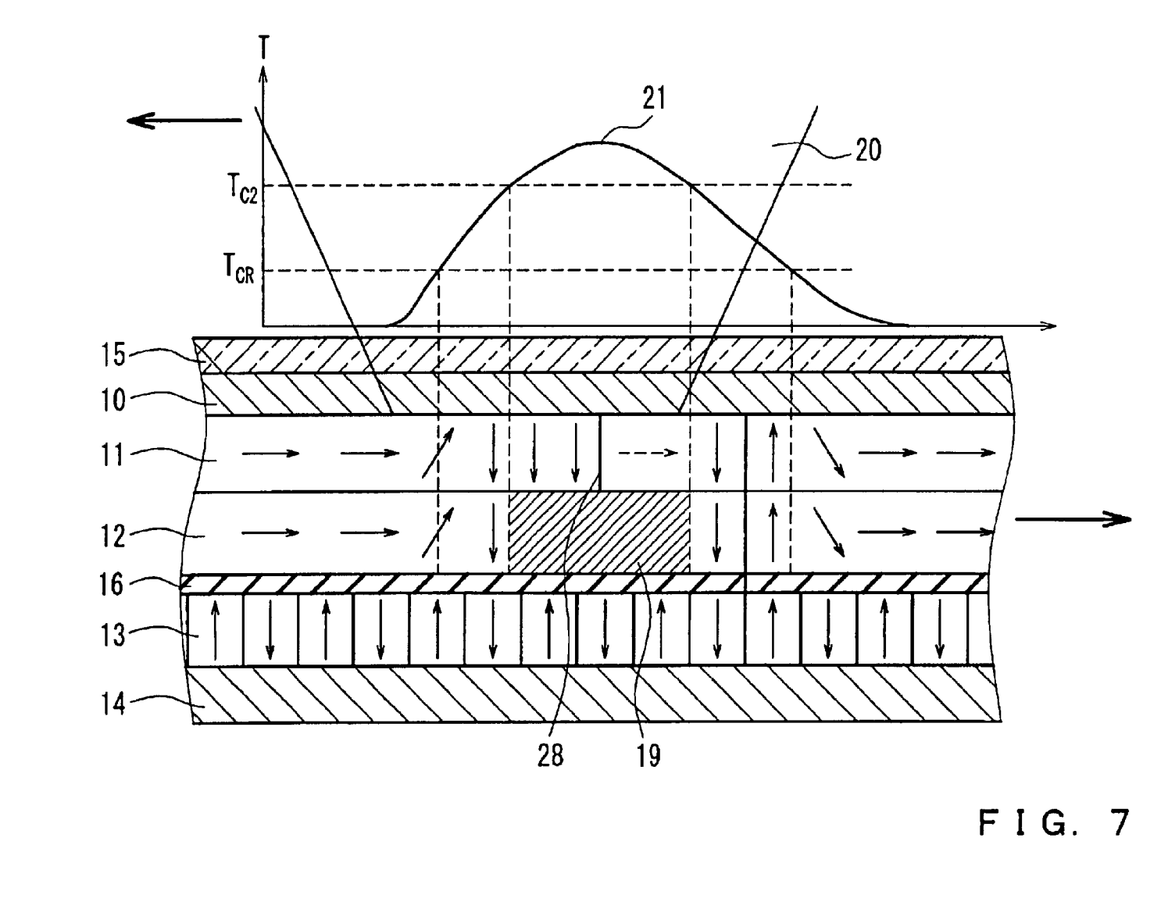
FIG. 7 is a cross sectional view of still another example of a magneto-optical recording medium of the present invention, along with magnetization states of magnetic films of the same and a temperature distribution therein.

A medium shown in FIG. 7 has the same film configuration as that of the medium described in the first embodiment except that a non-magnetic layer 16 is interposed between the intermediate layer 12 and the recording layer 13. Herein, a 10 nm thick SiN layer was provided as the nonmagnetic layer 16. In this medium, though the exchange coupling between the intermediate layer 12 and the recording layer 13 is broken by the nonmagnetic layer 16, a magnetic field is transferred by magnetostatic coupling from the recording layer 13 to the intermediate layer 12 in a temperature range of not lower than the critical temperature $T_{CR}$. The magnetic field further is transferred to the magnetic-domain enlarging layer 11, whereby the magnetic-domain enlargement reproduction is performed. The nonmagnetic layer preferably has a thickness of not less than 1 nm and not more than 10 nm. From a medium G produced under the same conditions as those in the first embodiment except that the foregoing non-magnetic layer was formed, reproduction signals with a C/N ratio of 40 dB were obtained at a mark length of 0.2 μm.

As described above, according to the present invention, upon reproduction of information utilizing the magnetic-domain enlargement, magnetic influences from tracks adjacent to a target track are suppressed. Besides, since suppression of cross-talk permits an increase in margins upon reproduction, the present invention is advantageous for decreasing sizes of devices. The medium of the present invention is compatible readily with a conventional medium.

The invention may be embodied in other forms without departing from the spirit or essential characteristics thereof. The embodiments disclosed in this application are to be considered in all respects as illustrative and not limiting. The scope of the invention is indicated by the appended claims rather than by the foregoing description, and all changes which come within the meaning and range of equivalency of the claims are intended to be embraced therein.

What is claimed is:

1. A magneto-optical recording medium comprising a substrate, and a multilayer film formed on the substrate, the multilayer film comprising a first magnetic layer, a second magnetic layer, and a third magnetic layer, the second magnetic layer being interposed between the first and third magnetic layers and having a Curie temperature $T_{C2}$ that is lower than a Curie temperature $T_{C1}$ of the first magnetic layer and a Curie temperature $T_{C3}$ of the third magnetic layer, the third magnetic layer being a perpendicular magnetization film, wherein in at least a part of a temperature range lower than the Curie temperature $T_{C2}$, the first magnetic layer is exchange-coupled with the second magnetic layer so as to be perpendicularly magnetized, and a magnetization of the third magnetic layer is transferred to the first magnetic layer via the second magnetic layer due to the exchange coupling, wherein the second magnetic layer is in an in-plane magnetization state at room temperature, and makes transition to a perpendicular magnetization state in a temperature range from a critical temperature $T_{CR}$ that is higher than room temperature to the Curie temperature $T_{C2}$, wherein the second magnetic layer contains an alloy expressed by a composition formula given as:

$$(Gd_xFe_{1-x})_{1-y}M_y,$$

where M represents at least one selected from Cr, Si, and Al, x represents a numerical value of not less than 0.15 and not more than 0.40, and y represents a numerical value of not less than 0 and not more than 0.30.

2. A magneto-optical recording medium comprising a substrate, and a multilayer film formed on the substrate, the multilayer film comprising a first magnetic layer, a second magnetic layer, and a third magnetic layer, the second magnetic layer being interposed between the first and third magnetic layers and having a Curie temperature $T_{C2}$ that is lower than a Curie temperature $T_{C1}$ of the first magnetic layer and a Curie temperature $T_{C3}$ of the third magnetic layer, the third magnetic layer being a perpendicular magnetization film, wherein in at least a part of a temperature range lower than the Curie temperature $T_{C2}$, the first magnetic layer is exchange-coupled with the second magnetic layer so as to be perpendicularly magnetized, and a magnetization of the third magnetic layer is transferred to the first magnetic layer via the second magnetic layer due to the exchange coupling, wherein the second magnetic layer is in an in-plane magnetization state at room temperature, and makes transition to a perpendicular magnetization state in a temperature range from a critical temperature $T_{CR}$ that is higher than room temperature to the Curie temperature $T_{C2}$, wherein the second magnetic layer contains an alloy expressed by a composition formula given as:

$(Tb_xFe_{1-x})_{1-y}M_y$, where M represents at least one selected from Cr, Si, and Al, x-represents a numerical value of not less than 0.15 and not more than 9.40, and y represents a numerical value of not less than 0 and not more than 0.30.

3. The magneto-optical recording medium according to claim 1, wherein a non-magnetic layer is provided between the second and third magnetic layers, and the second and third magnetic layers are magnetostatically coupled with each other in at least a part of a region at a temperature lower than the Curie temperature $T_{C2}$.

4. The magneto-optical recoding medium according to claim 3, wherein the non-magnetic layer has a thickness of not less than 1 nm and not more that 10 nm.

5. The magneto-optical recording medium according to claim 1, wherein the first magnetic layer is in an in-plane magnetization state at room temperature.

6. The magneto-optical recording medium according to claim 1, wherein the first magnetic layer is made of not less than two magnetic films.

7. A magneto-optical recording medium comprising a substrate, and a multilayer film formed on the substrate, the multilayer film comprising a first magnetic layer, a second magnetic layer, and a third magnetic layer, the second magnetic layer being interposed between the first and third magnetic layers and having a Curie temperature $T_{C2}$ that is lower than a Curie temperature $T_{C1}$ of the first magnetic layer and a Curie temperature $T_{C3}$ of the third magnetic layer, the third magnetic layer being a perpendicular magnetization film, wherein in at least a part of a temperature range lower than the Curie temperature $T_{C2}$, the first magnetic layer is exchange-coupled with the second magnetic layer so as to be perpendicularly magnetized, and a magnetization of the third magnetic layer is transferred to the first magnetic layer via the second magnetic layer due to the exchange coupling, wherein the second magnetic layer is in an in-plane magnetization state at room temperature and makes transition to a perpendicular magnetization state in a temperature range from a critical temperature $T_{CR}$ that is higher than room temperature to the Curie temperature $T_{C2}$, wherein the first magnetic layer is made of not less than two magnetic films, wherein the first magnetic layer includes a magnetic film A, and a magnetic film B having a Curie temperature higher than a Curie temperature of the magnetic film A, which are provided in the stated order from the second magnetic layer side.

8. A magneto-optical recording medium comprising a substrate, and a multilayer film formed on the substrate, the multilayer film comprising a first magnetic layer, a second magnetic layer, and a third magnetic layer, the second magnetic layer being interposed between the first and third magnetic layers and having a Curie temperature to that is lower than a Curie temperature $T_{C1}$ of the first magnetic layer and a Curie temperature $T_{C3}$ of the third magnetic layer, the third magnetic layer being a perpendicular magnetization film, wherein at least a part of a temperature range lower than the Curie temperature $T_{C2}$, the first magnetic layer is exchange-couple with the second magnetic layer so as to be perpendicularly magnetized, and a magnetization of the third magnetic layer is transferred to the first magnetic layer via the second magnetic layer due to the exchange coupling, wherein the second magnetic layer is in an in-plane magnetization state at room temperature, and makes transition to a perpendicular magnetization state in a temperature range from a critical temperature $T_{CR}$ that is higher than room temperature to the Curie temperature $T_{C2}$, wherein a fourth magnetic layer having a Curie temperature $T_{C4}$ that is higher than the Curie temperature $T_{C2}$ and the Curie temperature $T_{C1}$ is provided between the first and second magnetic layers.

9. The magneto-optical recording medium according to claim 2, wherein a non-magnetic layer is provided between the second and third magnetic layers, and the second and third magnetic layers are magnetostatically coupled with each other in at least a part of a region at a temperature lower than the Curie temperature $T_{C2}$.

10. The magneto-optical recoding medium according to claim 9, wherein the non-magnetic layer has a thickness of not less than 1 nm and not more than 10 nm.

11. The magneto-optical recording medium according to claim 2, wherein the first magnetic layer is in an in-plane magnetization state at room temperature.

12. The magneto-optical recording medium according to claim 2, wherein the first magnetic layer is made of not less than two magnetic films.

13. The magneto-optical recording medium according to claim 7, wherein a non-magnetic layer is provided between the second and third magnetic layers, and the second and third magnetic layers are magnetostatically coupled with each other in at least a part of a region at a temperature lower than the Curie temperature $T_{C2}$.

14. The magneto-optical recording medium according claim 13, wherein the non-magnetic layer has a thickness of not less than 1 nm and not more than 10 nm.

15. The magneto-optical recording medium according to claim 7, wherein the first magnetic layer is in an in-plane magnetization state at room temperature.

16. The magneto-optical recording medium according to claim 7, wherein the first magnetic layer is made of not less than two magnetic films.

17. The magneto-optical recording medium according to claim 8, wherein a non-magnetic layer is provided between the second and third magnetic layers, and the second and third magnetic layers are magnetostatically coupled with each other in at least a part of a region at a temperature lower than the Curie temperature $T_{C2}$.

18. The magneto-optical recoding medium according to claim 17, wherein the non-magnetic layer has a thickness of not less than 1 nm and not more than 10 nm.

19. The magneto-optical recording medium according to claim 8, wherein the first magnetic layer is in an in-plane magnetization state at room temperature.

20. The magneto-optical recording medium according to claim 8, wherein the first magnetic layer is made of not less than two magnetic films.

* * * * *

UNITED STATES PATENT AND TRADEMARK OFFICE
CERTIFICATE OF CORRECTION

PATENT NO. : 6,826,131 B2
DATED : November 30, 2004
INVENTOR(S) : Kawaguchi et al.

It is certified that error appears in the above-identified patent and that said Letters Patent is hereby corrected as shown below:

Column 13,
Line 25, "more that 9.40" should read -- more than 0.40 --.

Column 14,
Line 11, "a Curie temperature to" should read -- a Curie temperature $T_{c2}$ --.
Line 53, "recording medium according" should read -- recording medium according to --.

Signed and Sealed this

Thirteenth Day of December, 2005

JON W. DUDAS
*Director of the United States Patent and Trademark Office*